(No Model.) 2 Sheets—Sheet 1.
J. L. DOWNING.
HAND TRUCK.
No. 294,211. Patented Feb. 26, 1884.
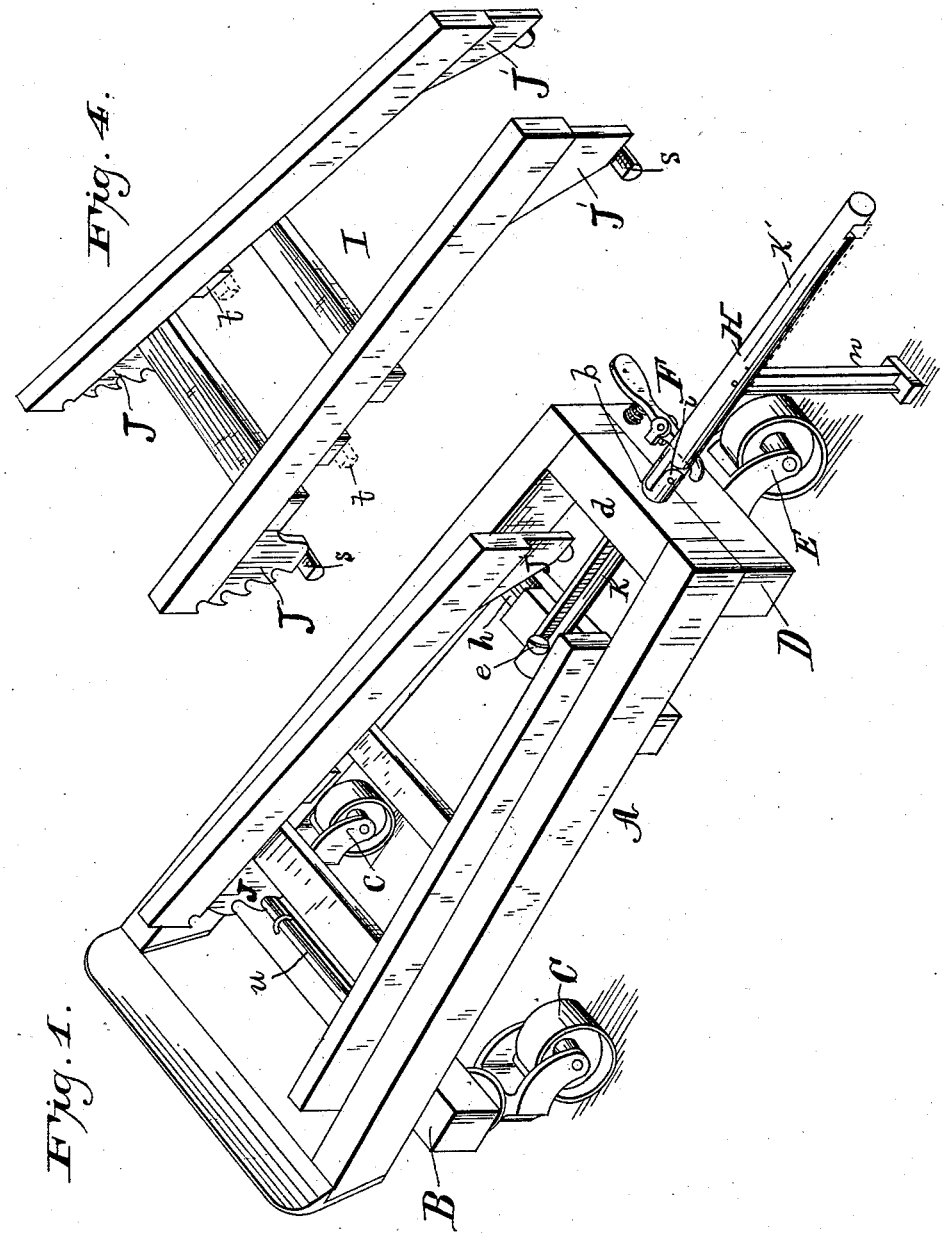
Witnesses:
Inventor:
James L. Downing
by S. S. Kane
Att'y.

(No Model.) 2 Sheets—Sheet 2.
J. L. DOWNING.
HAND TRUCK.
No. 294,211. Patented Feb. 26, 1884.
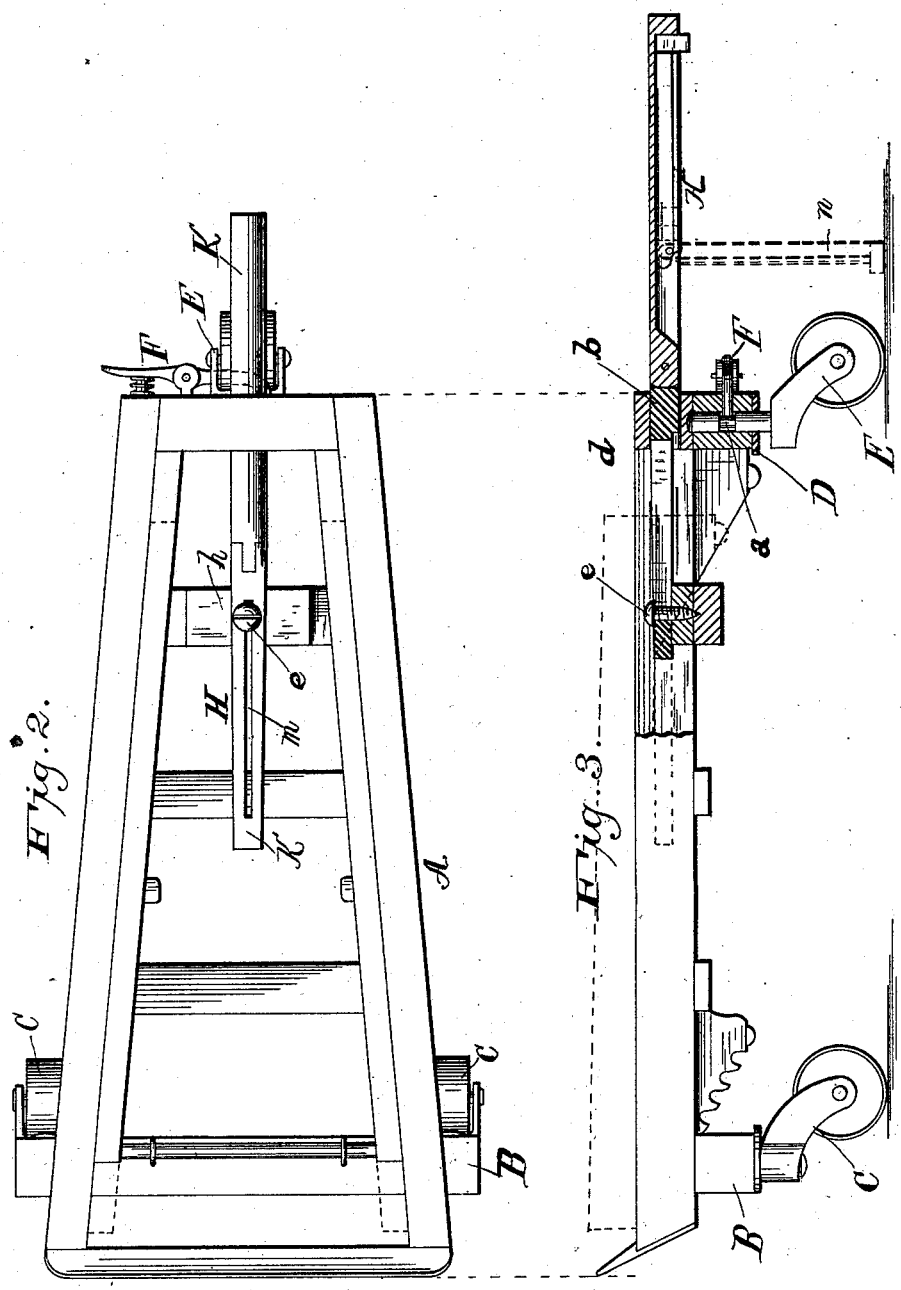

UNITED STATES PATENT OFFICE.

JAMES L. DOWNING, OF RICHMOND, ILLINOIS.

HAND-TRUCK.

SPECIFICATION forming part of Letters Patent No. 294,211, dated February 26, 1884.

Application filed December 8, 1883. (No model.)

*To all whom it may concern:*

Be it known that I, JAMES L. DOWNING, a citizen of the United States of America, residing at Richmond, in the county of McHenry and State of Illinois, have invented certain new and useful Improvements in Hand-Trucks; and I do hereby declare the following to be a full, clear, and exact description of the invention, such as will enable others skilled in the art to which it appertains to make and use the same.

This invention has for its main object to construct a hand-truck adapted for lifting and transporting stoves and like articles in stores and elsewhere, and for exhibiting the same in a sale.

Another object is to construct a hand-truck with a rear caster-wheel that can be readily detached from or adjusted to the truck-frame without much trouble and labor; also, to construct a truck with three caster or swivel wheels, so that the truck, with or without the article thereon, can be run in any desired direction in the smallest possible space; also, to construct a hand-truck with an auxiliary frame adapted to be vertically adjustable to suit stoves the legs of which are longer than the height of the frame of the truck.

With these and other objects in view, my invention will be hereinafter more fully set forth.

In the annexed drawings, Figure 1 is a perspective view of a hand-truck embodying my improvements, the auxiliary frame being shown in adjustable position. Fig. 2 is a plan view of the same. Fig. 3 is a side elevation, the front portion being broken away to show the caster-wheel connection and a handle-support; and Fig. 4 is a perspective view of the auxiliary frame detached.

The bed A of the truck is preferably made triangular in form, and the parts composing the truck-bed may be built in any desired substantial manner for the purpose intended.

To the ends of the front transverse bar, B, are swiveled in a suitable manner the caster-wheels C, and to the middle portion of the rear transverse bar, D, is swivelly connected the caster-wheel E by means of the forward end of the spring-lever F engaging with a groove, $a$, in the spindle. This spring-lever enables the caster-wheel to be readily detached whenever it is desired to lower the rear end of the truck-frame for the purpose hereinafter stated. The caster-wheels are provided with the usual spindle-sockets and wear-plates, and in some cases the caster-wheel with anti-friction rollers or balls may be employed. These swivel or caster wheels allow the truck to be moved in any direction and turned in the smallest possible space.

To the rear end of the truck-bed is fitted an adjustable handle or lever, H, by being passed through an opening, $b$, in the end piece, $d$, and engaging with a headed stud or set-screw, $e$, attached to a transverse brace-bar, $h$, as shown in Figs. 1 and 3 of the drawings. This handle is composed of two sections, $k$ $k'$, united by hinged joints $i$. The section $k$ is formed with a longitudinal slot, $m$, through which passes the set-screw $e$, to secure the adjustment of the handle, and the section $k'$ is provided with a pivoted support, $n$, and a groove or chamber to receive the same when folded up. This adjustable lever, with pivoted support, aside from its duty as a handle, serves the important office of a lever for elevating the rear end of the truck, to detach or attach the rear caster-wheel while loading and unloading the truck.

I represents an auxiliary frame composed of two side pieces converging toward the rear end, transverse connecting-bars, the inclined lifts J J', the lifts J being notched or serrated, the side-limit stops $s$, and the turn-buttons $t$, as shown in Fig. 4 of the drawings. This frame I is adjusted within and between the side bars of the truck-bed, and when down in a normal condition is fastened to the truck-frame by the turn-buttons.

By reference to Fig. 1 it will be observed that the lifts J' of the frame I engage with and ride upon the transverse bar $h$, while the notched lifts J preferably engage with the round metallic rod $u$ on the upper surface of the bar B. By means of this adjustable frame articles having supporting-legs of a length greater than the height of the truck-bed can be raised from the floor and moved on the truck.

This frame is used in the following manner: When a stove is to be moved from one room to another, or brought into position for view and examination, the caster-wheel E is detached and the rear end of the truck is run under the stove, resting on its legs, until arrested by striking the base of the stove, then by withdrawing the lever and dropping the support n a leverage is secured to raise the rear end of the truck and the stove from the floor, and to adjust the detached caster-wheel to its socket and automatic fastening; and by lifting the support and arranging it in the lever the stove on the truck is now in condition for transportation and exhibition. Whenever the legs of the stove are higher than the truck-bed the auxiliary frame is adjusted against the base of the stove through the agency of the lifts J engaging with the metallic rod u or its equivalent, and the lifts J' riding upon the transverse bar h, and the stove is lifted from the floor upon the truck in the manner as hereinbefore stated.

The truck-frame should be of such a length as to extend with its wheels across the ordinary-size zinc board arranged under the stove, so that the zinc board can be adjusted properly while the stove is elevated or raised.

I wish it distinctly understood that I reserve the right to vary the construction and arrangement of parts without departing from the spirit of the invention—for example, the lifts J' may be notched like those of J, to engage with a bar or rod, and the auxiliary frame may be arranged outside of the truck-bed instead of within, and the adjusting means may be of a different construction for producing the same results.

What I claim as my invention, and desire to secure by Letters Patent, is—

1. A truck-frame mounted on three wheels, substantially as described, the single wheel at one end of the frame being detachable, so that this end of the said truck-frame can be lowered and adjusted under the object to be raised.

2. In a hand-truck, the combination of a truck-frame mounted on three caster-wheels, one of which is readily detachable, and a handle with leverage means, substantially as and for the purposes set forth.

3. A hand-truck having at its rear end a detachable caster-wheel, a locking device, and handle with leverage means, substantially as and for the purpose set forth.

4. The combination, with a truck-frame mounted on wheels, one of which is detachable, of an adjustable handle or lever with a pivoted support to rest on the floor, substantially as and for the purpose set forth.

5. The combination, with a truck-frame mounted on wheels, one of which is detachable, of an auxiliary frame adjustably connected to the truck-frame, and a handle with leverage means, substantially as and for the purposes set forth.

6. In a hand-truck, an adjustable frame composed, essentially, of the connected side pieces and inclined lifts, as described.

7. In a hand-truck, the adjustable handle composed of the hinged sections k k' and pivoted support n, substantially as and for the purpose set forth.

8. The improved hand-truck consisting, essentially, of a bed-frame mounted on three caster-wheels, one of which is readily detachable, an auxiliary adjustable frame, and an adjustable handle with leverage means, substantially as described.

In testimony whereof I affix my signature in presence of two witnesses.

JAMES L. DOWNING.

Witnesses:
W. H. HODGE,
H. GILLESPIE.